(12) United States Patent
Wieser et al.

(10) Patent No.: US 7,857,564 B2
(45) Date of Patent: Dec. 28, 2010

(54) EXPANSION DOWEL

(75) Inventors: Juergen Wieser, Kaufering (DE); Thomas Doppelbauer, Feldkirch (AT); Simon Martin, Goefis (AT)

(73) Assignee: Hilti Aktiengesellschaft, Schaan (LI)

( * ) Notice: Subject to any disclaimer, the term of this patent is extended or adjusted under 35 U.S.C. 154(b) by 142 days.

(21) Appl. No.: 11/894,863

(22) Filed: Aug. 21, 2007

(65) Prior Publication Data
US 2008/0050195 A1    Feb. 28, 2008

(30) Foreign Application Priority Data
Aug. 23, 2006    (DE)    .................. 10 2006 000 413

(51) Int. Cl.
*F16B 13/06*    (2006.01)

(52) U.S. Cl. .................. 411/60.1; 411/44; 411/53; 411/80.6; 411/354

(58) Field of Classification Search .................. 411/44, 411/60.1, 60.2, 75, 80.6, 354, 49–53
See application file for complete search history.

(56) References Cited

U.S. PATENT DOCUMENTS

| | | | | | |
|---|---|---|---|---|---|
| 2,146,461 | A | * | 2/1939 | Bettington | .................. 29/512 |
| 2,377,077 | A | * | 5/1945 | Gay et al. | .................. 411/75 |
| 3,313,200 | A | * | 4/1967 | Fischer | .................. 411/53 |
| 3,456,551 | A | * | 7/1969 | Ishihara | .................. 411/75 |
| 3,523,482 | A | * | 8/1970 | Ploch et al. | .................. 411/49 |
| 3,577,825 | A | * | 5/1971 | Reusser | .................. 411/53 |
| 3,785,241 | A | * | 1/1974 | Fischer | .................. 411/38 |
| 4,048,898 | A | * | 9/1977 | Salter | .................. 411/44 |
| 4,656,806 | A | * | 4/1987 | Leibhard et al. | .................. 52/704 |
| 4,854,793 | A | * | 8/1989 | Ollivier et al. | .................. 411/49 |
| 5,176,481 | A | * | 1/1993 | Schiefer | .................. 411/60.1 |
| 5,366,328 | A | * | 11/1994 | Helderman | .................. 411/17 |
| 5,374,145 | A | * | 12/1994 | Mairesse et al. | .................. 411/54 |
| 5,664,900 | A | * | 9/1997 | Matthies | .................. 403/297 |
| 5,702,216 | A | * | 12/1997 | Wu | .................. 411/32 |
| 7,309,199 | B2 | * | 12/2007 | Ayrle | .................. 411/82 |
| 2002/0054805 | A1 | * | 5/2002 | Kaibach et al. | .................. 411/60.1 |
| 2002/0106256 | A1 | * | 8/2002 | Kaibach et al. | .................. 411/60.1 |
| 2003/0108398 | A1 | * | 6/2003 | Sathianathan | .................. 411/60.1 |

* cited by examiner

*Primary Examiner*—Victor Batson
*Assistant Examiner*—Roberta Delisle
(74) *Attorney, Agent, or Firm*—Abelman, Frayne & Schwab

(57) ABSTRACT

An expansion dowel includes an anchor bolt (12) having a load application element (16) at a first end region (14) of the anchor bolt (12), and an expansion part (17) at a second free end region (15) of the anchor bolt (12), and an expansion sleeve (21) having an inner profile (22) with a region (23) having a surface roughness increasing in the direction of the first end region (14) of the anchor bolt (12), with the expansion part (17) having a conical section (18) widening toward the second free end region (15) of the anchor bolt (12) for expanding the expansion sleeve (18).

5 Claims, 2 Drawing Sheets

EXPANSION DOWEL

BACKGROUND OF THE INVENTION

1. Field of the Invention

The present invention relates to an expansion dowel having an anchor bolt and an expansion sleeve. The anchor bolt has load application means provided at a first end region of the anchor bolt, and an expansion part provided at a second free end region of the anchor bolt opposite the first end region. The expansion part has a conical section widening toward the second free end region of the anchor bolt for expanding the expansion sleeve. The expansion sleeve has an inner profile with a region having a surface roughness.

2. Description of the Prior Art

Expansion dowels of the type described above serve as attachment elements for attaching objects to constructional components. In a constructional component, a borehole is formed into which subsequently an expansion dowel is driven in. Then, e.g., with a nut, which is screwed on the load application means, the anchor bolt is pulled in a direction opposite the setting direction of the dowel. As a result of the backward movement of the expansion part of the anchor dowel, the expansion sleeve is widened by the expansion part, anchoring the dowel in the constructional component.

The expansion forces, which are generated by a dowel, should be sufficiently large in order to insure the transmission of the operational load of the dowel. On the other hand, the expansion forces should not be too large, to an extent that the expansion forces negatively influence the axial and edge spacing of several expansion dowels. The expansion behavior of an expansion dowel is influenced by a geometrical shape of the expansion dowel, e.g., by selection of a cone angle of the conical section of the expansion part or by dimensions of the expansion sleeve. The geometrical shape of an expansion dowel defines a torque with which a predetermined expansion force and, thereby, a predetermined withdrawal load are achieved.

In practice, however, often higher torques than predetermined ones are applied to an expansion dowel because, in most cases, torque wrenches are not used for anchoring an expansion dowel in a constructional component. The possibility of using higher, than predetermined torques requires that the axis and edge distances be determined with a corresponding reliability with respect to the torque, otherwise a technical potential of an expansion dowel cannot be completely utilized. Further, in an extreme case, the expansion part can be pulled through the expansion sleeve which would result in a complete failure of the obtained attachment.

German Publication DE 41 23 353 A1 discloses an expansion dowel having an anchor bolt and an expansion sleeve. The anchor bolt has load application means provided at a first end region of the anchor bolt, and an expansion part provided at a second free end region of the anchor bolt opposite the first end region. The expansion part has a conical section widening toward the second free end region of the anchor bolt for expanding the expansion sleeve. The expansion part has a smooth surface and a surface provided with circumferential grooves having an increasing groove depth With an increase of friction upon locking of the dowel, the pulling of the expansion part through the expansion sleeve is prevented even with application of high loads.

The drawback of the expansion dowel of DE 41 23 353 A1 consists in that for forming the expansion part an additional and expensive operational process is required. Moreover, with the arrangement of the grooves on the conical section, sliding of the sleeve becomes difficult not only in the expanded condition of the sleeve but also at the start of the sleeve expanding process. However, it is at the start of the expanding process that the expansion sleeve should be able to slide easily to insure friction between the outer surface of the sleeve and the wall of a borehole. If at the start of an expansion process, the friction inside the expansion sleeve is greater than the outer friction, no relative movement between the expansion sleeve and the expansion part takes place, only withdrawal of the anchoring portion or even of the entire dowel occurs. Further, the grooves, which are formed on the expansion part, have only a limited active region. Upon tightening of the expansion dowel, the grooves are filled with the shaved material of the expansion sleeve so that after a certain expansion path, only thickening of the expansion part still produces a braking effect. As a result, upon application a further torque, the expansion part, without means for increasing the pulling resistance, can be pulled through the expansion sleeve.

For another purpose, namely, in order to reduce the friction between the expansion part and the expansion sleeve, European Patent EP 0 790 741 B1 discloses an expansion dowel in which the inner profile of the expansion sleeve has a region with a surface roughness. The increase roughness is produced by spark machining or with an embossing tool having a spark-machined or etched surface. The resulting diminished bearing surface of the inner profile of the expansion sleeve, along which the anchor bolt is displaced, permits to reduce friction between the anchor bolt and the expansion sleeve during setting of the expansion dowel, which reduces the force necessary for expanding the expansions sleeve with the expansion part.

The drawback of the dowel of European Patent EP 0 790 741 B1 consists in that the expansion part can be pulled through the expansion sleeve when the predetermined torque is exceeded. Further, with this expansion dowel, with an actual torque exceeding the predetermined torque, expansion forces can be generated in the constructional component which requires determination of minimal axis and edge distances with a corresponding reliability, so that the technical potential of the expansion dowel can be completely utilized.

Accordingly, an object of the present invention is an expansion dowel having a high resistance against the expansion part of the anchor bolt being pulled through the expansion sleeve.

Another object of the present invention is an expansion dowel that can be easily manufactured.

SUMMARY OF THE INVENTION

This and other objects of the present invention, which will become apparent hereinafter, are achieved by providing, in the expansion dowel, an expansion sleeve the inner profile of which is provided with a region having a surface roughness increasing in the direction of the first end region of the anchor bolt.

Surprisingly, it was found out that such an expansion dowel can be simply and, thus, economically manufactured, while the expansion forces of the expansion dowel can be advantageously controlled.

Upon tightening of the expansion dowel, the region of the inner profile with the increasing surface roughness of the expansion sleeve bears against the expansion part of the anchor bolt. Due to the increasing friction between the expansion part and the expansion sleeve upon further increase of the withdrawal torque, the expansion forces, which are produced by the expansion sleeve and act in the constructional component do not increase any further or increase very insignificantly. With the increasing surface roughness of the inner profile of the expansion sleeve, upon a continuous tightening of the expansion dowel, a new portion of the region with an increasing surface roughness comes into contact or bears against the expansion part. Thus, the entire active region of the region with an increasing surface roughness is available for increase of the pulling resistance. The failure of the produced attachment as a result of the expansion part being pulled through the expansion sleeve is almost completely prevented, or a very high load should be applied. Thereby, the technical potential of the expansion dowel according to the present invention can be used to a most possible extent.

The increasing surface is formed advantageously during the manufacturing of the expansion sleeve. When the expansion sleeve is formed as a sheet metal part, the increasing surface roughness is produced during stamping-bending process.

Advantageously, the region having an increasing surface roughness extends from an end of the expansion sleeve adjacent to the first end region of the anchor bolt at least region-wise in a direction of the second free end region of the anchor bolt. Thereby, upon expansion of the dowel there is formed, for the expansion sleeve, a first displacement region with a low friction as the surface pressure in this region between the anchor bolt and the expansion sleeve is low. The anchor bolt has, advantageously, a neck about which the expansion sleeve is arranged. The expansion behavior of the expansion dowel can be additionally influenced by adaptation of the diameter of the neck section of the anchor bolt to the inner diameter of the expansion sleeve. As soon as the region with an increasing surface roughness comes into contact with the surface of the expansion part, the friction between the anchor bolt and the expansion sleeve noticeably increases. Therefore, upon a further increase of the pulling torque, the displacement of the anchor bolt relative to the expansion sleeve is braked, whereby the increase of the expansion forces acting in the construction component, is slowed down.

Advantageously, the increasing surface roughness of the region is formed by a profile elevations of which project beyond a radial inner generatrix of the expansion sleeve. The profile can be formed as serration or knurling the peaks of which form the above-mentioned elevations. If the expansion sleeve is formed as a sheet metal part, the profile can be formed, e.g., by embossing or rolling on the inner profile of the expansion sleeve. Alternatively, in order to form a region with an increasing surface roughness, a suitable coating can be provided on the inner profile of the expansion sleeve.

Advantageously, the profile elevations have an increased height in the direction of the first end of the anchor bolt, which leads to an increase in friction upon expansion of the dowel, with an increased displacement of the anchor sleeve in the axial direction.

Advantageously, the elevations of the profile are oriented in the direction of the first end region of the anchor bolt. Because of this orientation, the increase of the friction upon an increased axial advance of the expansion sleeve, can be controlled particularly well, preventing the undesirable passing of the anchor bolt through the expansion sleeve. Advantageously, the elevations of the profile extend essentially parallel to the longitudinal extension of the anchor bolt.

The novel features of the present invention, which are considered as characteristic for the invention, are set forth in the appended claims. The invention itself, however, both as to its construction and its mode of operation, together with additional advantages and objects thereof, will be best understood from the following detailed description of the preferred embodiment, when read with reference to the accompanying drawings.

DETAILED DESCRIPTION OF THE PREFERRED EMBODIMENT

Figure 1:
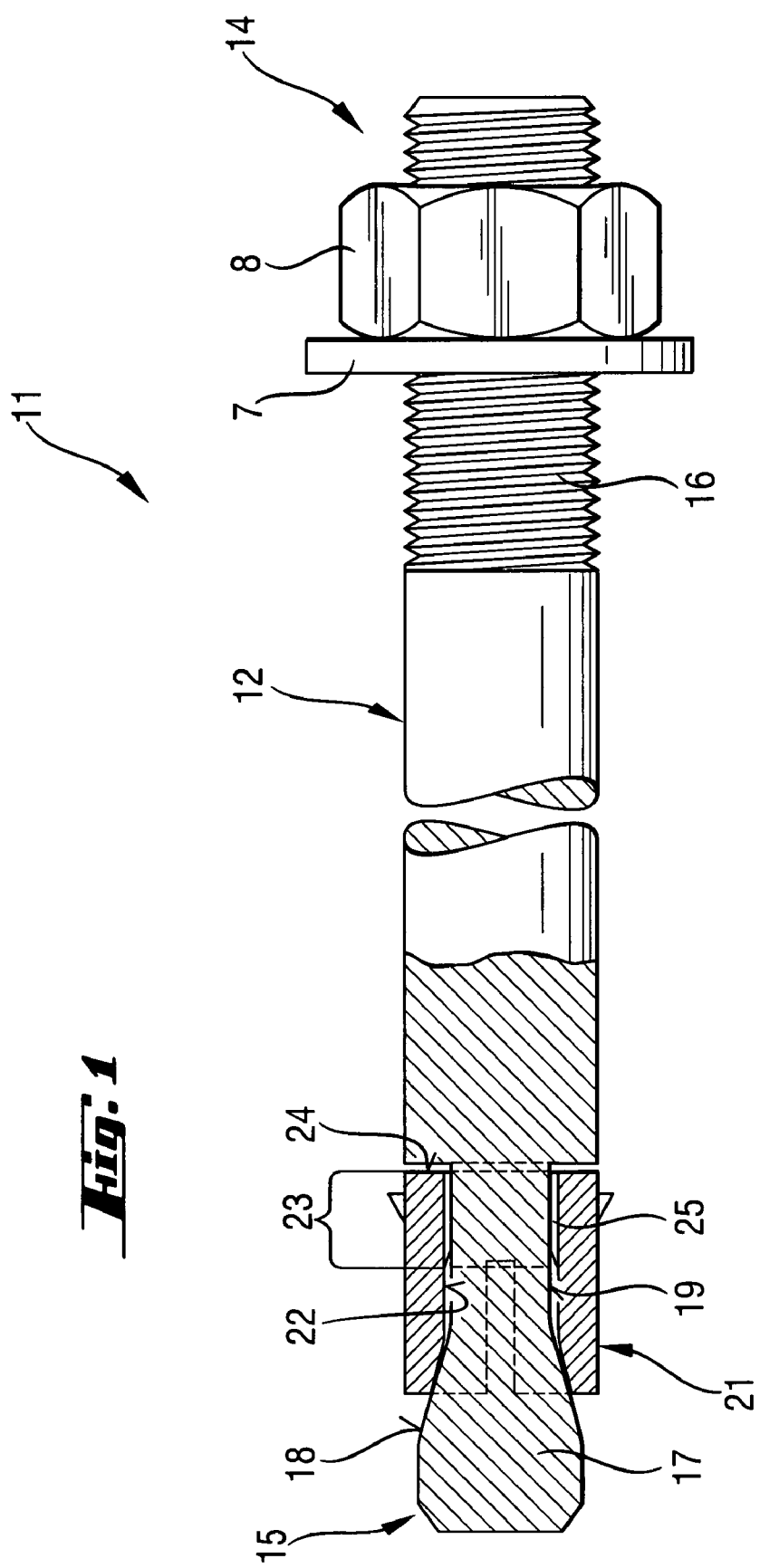
FIG. 1 an elevational, partially cross-sectional view of an expansion dowel according to the present invention.
Figure 2:
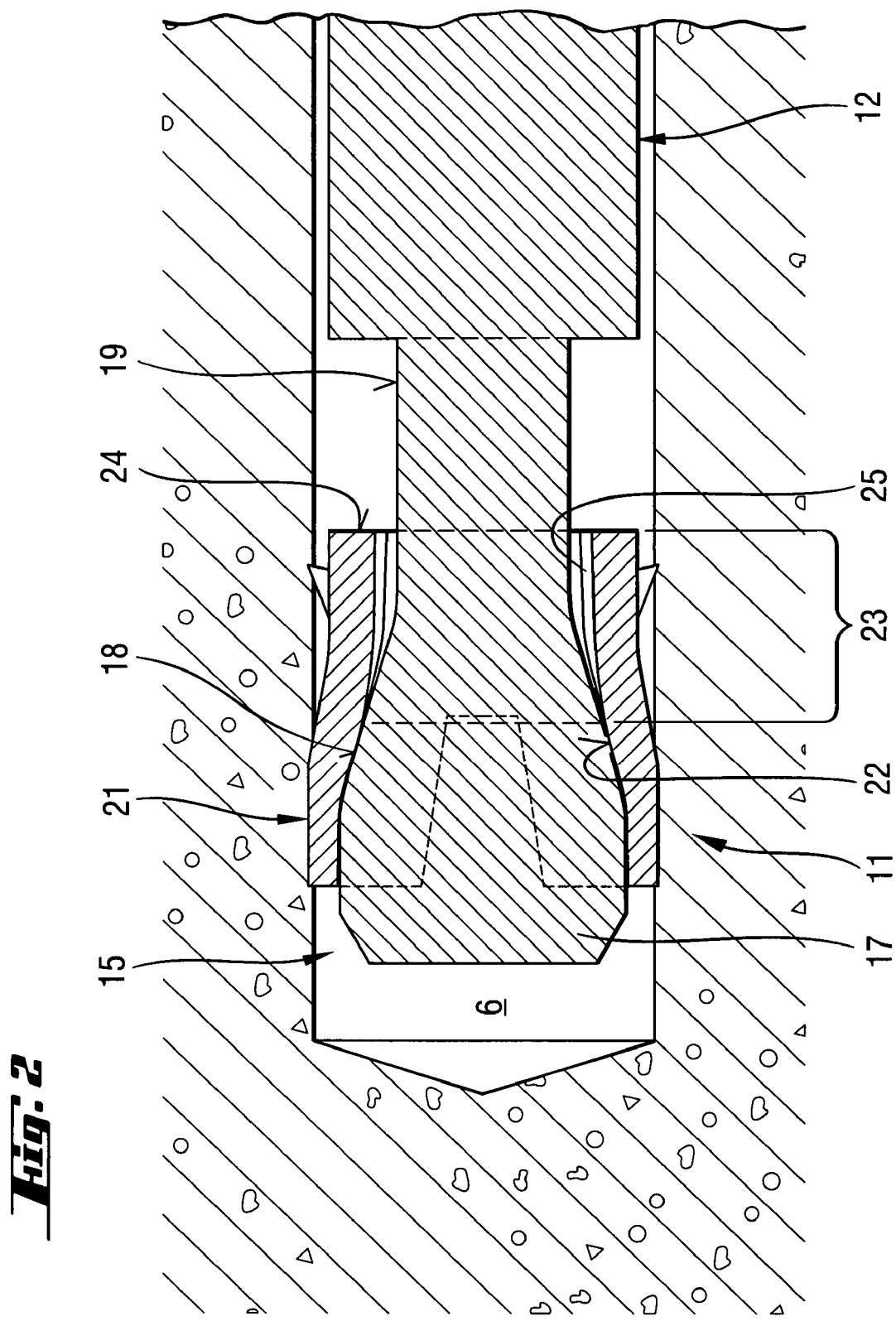
FIG. 2 a detailed view of the expansion region of the dowel shown in FIG. 1 in a set condition of the dowel.

An expansion dowel 11 according to the present invention, which is shown in the drawings, has an anchor bolt 12 and an expansion sleeve 21. At its first end region 14, the anchor bolt 12 has a threaded section that serves as load application means 16. At its second end region 15, the anchor bolt 12 is provided with an expansion part 17 for expanding the expansion sleeve 21. In the embodiment shown in the drawings, the expansion part 17 is formed integrally with the anchor bolt 12. The expansion part 17 has a conical section 18 that widens in the direction of the free end of the second end region 15 of the anchor bolt 12. On the anchor bolt 12, there is provided a neck 19 in which the expansion sleeve 21 is arranged.

The expansion sleeve 21 has, on its inner profile 22, a region 23 having an increasing surface roughness and bringable in abutment with the expansion part 17. The region 23 extends from an end 24 of the expansion sleeve 21 adjacent to the first end region 14 of the anchor bolt 12 and in the direction of the free end of the second end region 15 of the anchor bolt 12. The increasing surface roughness is formed by a profile 25 having an increasing height in the direction of the first region 14 of the anchor bolt 15. The elevations of the profile 25, which project beyond the inner generatrix of the expansion sleeve 21, run in the direction of the first end region 14 of the anchor bolt 12 parallel to the anchor bolt 12.

The expansion dowel 11 is driven in a preliminary formed borehole 6 and is locked, e.g., with a nut 8 that engages a washer 7. Upon further rotation of the nut 8, the anchor bolt 12 is displaced axially into the expansion sleeve 21 that becomes clamped between the expansion part 17 of the anchor bolt 12 and the wall of the borehole 6. As a result, the region 23 which has, as it has already been discussed above, an increasing surface roughness, comes in abutment with the conical section 18 of the expansion part 17. Thereby, upon a farther application of a torque, the frictional resistance between the expansion sleeve 21 and the expansion part 17 of the anchor bolt 12 also progressively increases.

Though the present invention was shown and described with references to the preferred embodiment, such are merely illustrative of the present invention and are not to be construed as a limitation thereof and various modifications of the present invention will be apparent to those skilled in the art. It is, therefore, not intended that the present invention be limited to the disclosed embodiment or details thereof, and the present invention includes all variations and/or alternative embodiments within the spirit and scope of the present invention as defined by the appended claims.

What is claimed is:

1. An expansion dowel, comprising
an expansion sleeve (21); and
an anchor bolt (12) having load application means (16) provided at a first end region (14) of the anchor bolt (12), and an expansion part (17) provided at a second free end region (15) of the anchor bolt (12) opposite the first end region (14), the expansion part (17) having a conical section (18) widening toward the second free end region (15) of the anchor bolt (12) for expanding the expansion sleeve (21) upon being pulled inside the expansion sleeve (21) in a direction opposite a setting direction of the dowel, wherein an inner profile (22) of the expansion sleeve (21) is provided with a region (23) having a surface roughness with an increasing profile elevation of closely spaced valleys and peaks of the inner profile in the direction opposite a setting direction of the dowel for essentially preventing the pulling of the expansion part through the expansion sleeve upon an applied torque exceeding a predetermined torque necessary for expanding the expansion sleeve (21).

2. An expansion dowel according to claim 1, wherein the region (23) having an increasing surface roughness extends from an end (24) of the expansion sleeve (21) adjacent to the first end region (14) of the anchor bolt (12) at least regionwise in a direction of the second free end region of the anchor bolt (12).

3. An expansion dowel according to claim 1, wherein the increasing surface roughness of the region (23) is formed by the profile (25) elevation of which project beyond a radial inner generatrix of the expansion sleeve (21).

4. An expansion dowel according to claim 3, wherein the elevations of the profile (25) have a height increasing in a direction of the first end region (14) of the anchor bolt (12).

5. An expansion dowel according to claim 3, wherein the elevations of the profile (25) are oriented in the direction of the first end region (14) of the anchor bolt (12).

* * * * *